3,397,232
METHOD OF INHIBITING POLYMERIZATION OF ACRYLAMIDE
Kazumi Takagi and Tamio Tsunokawa, Niihama-shi, Japan, assignors to Sumitomo Chemical Company, Ltd., Osaka, Japan, a corporation of Japan
No Drawing. Filed Mar. 21, 1966, Ser. No. 535,707
Claims priority, application Japan, Mar. 25, 1965, 40/17,612; May 31, 1965, 40/32,344; June 2, 1965, 40/32,580, 40/32,581
10 Claims. (Cl. 260—561)

ABSTRACT OF THE DISCLOSURE

Unwanted polymerization of acrylamide is inhibited by adding at least one inhibitor comprising nitrosobenzene, nitrosometacresol, and sodium-1-naphthylamine-4-sulfonate.

---

This invention relates to a method of inhibiting polymerization of acrylamide, and to a stabilized acrylamide.

In general, acrylamide is produced by hydrolyzing acrylonitrile with sulfuric acid and water to form acrylamide sulfuric acid salt, neutralizing said acrylamide sulfuric acid salt with alkali such as ammonia, or hydroxide or carbonate of ammonia, alkali metal or alkaline earth metal in the presence of water or an organic solvent such as isopropyl alcohol or methanol, removing the resulting alkali sulfate to form a solution of acrylamide or separating mixed crystals of acrylamide and alkali sulfate and extracting acrylamide from the mixed crystals by organic solvent to form a solution of acrylamide, concentrating or cooling said solution to crystallize acrylamide and then separating and drying it. Thus, the process of the production of acrylamide involves steps, in which acrylamide is treated at high temperatures such as hydrolysis, neutralization, concentration and drying steps.

Acrylamide tends to polymerize with marked ease. Therefore, unless a polymerization-inhibiting procedure is adopted in the operations of the above steps, a large amount of polymerizate is formed to make the operation impracticable as well as to lower the purity and yield of the acrylamide product.

During a long time storage of the product acrylamide also, the polymerization gradually proceeds to deteriorate the quality of the product, unless a polymerization-inhibiting procedure is adopted. Generally, acrylamide contains a small amount of ammonium acrylate or acrylic acid. These compounds are more readily polymerizable than acrylamide with the result that the polymerization of acrylamide is further accelerated Conventionally, many compounds have been proposed as poymerization inhibitors for acylamide and, among these, a ferrous salt or copper salt such as ferrous sulfate or cupric sulfate has frequently been used for the polymerization inhibition However, such known polymerization inhibitors suffer from such drawbacks that, when used in a small amount, they give little effect, whereas, when used in excessively large amount, they color acrylamide and lower the degree of polymerization of acrylamide when subjected to polymerization or copolymerization. Thus, there are very few compounds which effectively show polymerization-inhibiting effect for any form of acrylamide without accompanying drawbacks such as coloration.

One object of the present invention is to provide a method of effectively inhibiting polymerization of acrylamide without accompanying unfavorable coloration.

Another object of the present invention is to provide a stabilized acrylamide. Other objects will become apparent from the following description.

In order to accomplish these objects, the present invention provides a method of inhibiting polymerization of acrylamide which comprises making present together with the acrylamide at least one polymerization inhibitor selected from the group consisting of nitrosobenzene, nitrosometacresol (4-nitroso-3-methylphenol), and sodium-1-naphthylamine-4-sulfonate.

These polymerization inhibitors effectively display polymerization-inhibiting ability to various forms of acrylamide in its production steps and in storage, and their inhibiting effects are never lowered even in the presence of divalent or trivalent iron which tends to be incorporated from the material of production apparatus. That is, these polymerization inhibitors can completely inhibit the polymerization of acrylamide even under severe acrylamide-treating conditions encountered, during its production, in neutralization, extraction, concentration, separation and drying steps in which acrylamide is treated in the form of an aqueous solution, an organic solvent solution, a slurry or crystals, and can completely prevent such operational obstacles as the adhesion of gel-like polymerizate, the injury in flowability of liquid or slurry and the difficulty of centrifugal separation. Therefore, the resulting acrylamide contains substantially no polymerizate, and hence is highly pure and excellent in water and methanol solubility. In storing the product, when the above polymerization inhibitors are incorporated in small amounts into crystals or aqueous or alcohol solution of acrylamide, the polymerization is inhibited to make it possible to store the product for a long period of time. Further, when the above polymerization inhibitors are used, there is not caused coloration of acrylamide which becomes a drawback in using the product for various applications.

Table 1 shows the effects of inhibiting the polymerization of acrylamide by way of the period of time before acrylamide initiates the polymerization under considerably severe conditions, i.e., the period time before an acryl- TABLE 1.—PERIOD OF TIME BEFORE ACRYLAMIDE SAMPLE INITIATES TO BECOME WHITE AND TURBID AND EXTENT OF ITS COLORATION

| Added polymerization inhibitor | Period of time before turbidity initiation (min.) | | | Extent of coloration |
|---|---|---|---|---|
| | Test condition I | Test condition II | Test condition III | |
| None | 30 | 18 | 2 | Colorless. |
| | >420 | >240 | 162 | Pale yellowish brown shade. |
| Nitrosometa-cresol | >420 | >280 | 185 | Pale yellowish green shade. |
| | >420 | >270 | 338 | Pale yellow shade. |
| Paranitroso-benzoic acid | >420 | >270 | 320 | Do. |
| | >420 | >270 | 180 | Pale yellow to pale yellowish green shade. |
| Nitrosobenzene | >420 | >300 | 390 | Pale yellowish green shade. |
| | >420 | >150 | 180 | Colorless. |
| | >420 | >150 | 220 | Do. |
| | >420 | >210 | 330 | Pale gray shade. |
| Sodium-1-naphthylamine-4-sulfonate | >420 | >240 | 300 | Almost colorless. |
| | >420 | >270 | 250 | Slightly brown shade. |
| Ferrous sulfate | 56 | 48 | 8 | Blue green to brown shade. |
| Cupric sulfate | 42 | 83 | 6 | Green shade. | amide sample initiates to become white and turbid by polymerization, and also indicates the extent of coloration of acrylamide.

(I) 2,000 p.p.m. (by weight) of a polymerization inhibitor was added to 99.4% purity acrylamide containing 0.2% (by weight) acrylic acid, and the mixture was heated and melted at 95°–100° C. and was subjected to measurement in that state.

(II) To an acrylamide solution comprising 39.2% (by weight) acrylamide, 50.2% (by weight) methanol, 0.26% (by weight) acrylic acid, 0.32% (by weight) ammonium sulfate and 10.0% (by weight) water was added 1,000 p.p.m. (by weight) based on the weight of acrylamide of a polymerization inhibitor, and the mixture was subjected to measurement in the step of being concentrated at 50° C./200 mm. Hg.

(III) Acrylonitrile was hydrolyzed in the presence of sulfuric acid, using ferrous sulfate as a polymerization inhibitor, was then neutralized with ammonia and then mixed crystals of acrylamide and ammonium sulfate were separated from the liquid and acrylamide was extracted by methanol from the mixed crystals to obtain an acrylamide solution. From this solution, acrylamide crystals were obtained. To the 99.0% purity acrylamide crystals thus obtained, each 0.5% (by weight) of acrylic acid was added to prepare samples. To each sample, was added 1,000 p.p.m. (by weight) based on the weight of acrylamide of a polymerization inhibitor in the form of a methanol solution. The mixture was heated to 95° C. to melt the acrylamide and was subjected to measurement in that state.

As is clear from Table 1, all of these polymerization inhibitors exhibit excellent polymerization inhibiting abilities under each test conditions of (I), (II) and (III), and do not show coloration which lowers commodity value of acrylamide, except very light colors of negligible extent.

In the present invention, the amount of the polymerization inhibitor to be added is ordinarily within the range of from 0.0005 to 1.0% (by weight) and preferably from 0.001 to 0.5% (by weight), based on the weight of acrylamide. Of course, suitable addition amount varies depending on the environmental conditions of acrylamide or the kind of polymerization inhibitor employed. For example, for the polymerization inhibition of product acrylamide crystals, the addition amount of from 0.0005 to 0.05% (by weight), particularly from about 0.001 to 0.01% (by weight), is preferable according to the time required for polymerization inhibition. Under severe conditions in the production of acrylamide, the addition amount of about 0.005 to 0.1% (by weight) is preferred, and, under more severe conditions, there are some cases where the addition amount is about 0.1 to 1.0% (by weight). Of course, it is not objectionable to add the inhibitors in large amounts exceeding said preferable ranges. Even in such cases, there is no such drawback that particularly marked coloration tendency is given to the product acrylamide or to products derived therefrom.

Among the polymerization inhibitors of the present invention, nitrosobenzene, and nitrosometacresol are particularly high in polymerization-inhibiting ability, and sodium-1-naphthylamine-4-sulfonate is particularly low in property to color acrylamide. Generally speaking, it appears that compounds having nitroso groups are higher in polymerization-inhibiting ability than others, and compound having amino group is more excellent than others in that they do not color acrylamide.

A polymerization inhibitor desired to be used is optionally selected from the polymerization inhibitors of the present invention, taking into consideration said polymerization-inhibiting ability and coloring property, as well as stability, escaping property (volatility) and easiness of obtainment of the inhibitor, and whether or not the inhibitor becomes an obstacle when acrylamide is put into various uses. For example as the inhibitor in the production steps, e.g., in the neutralization step, nitrosobenzene is preferably used. In this case addition amount of 0.005 to 0.1% by weight based on acrylamide is preferred. In the production steps, the treating condition is severe and high polymerization inhibition ability is required, so usually more amount of inhibitor is used in the production steps than in storing of acrylamide. As nitrosobenzene has a tendency to escape, even when used in large amount in the production steps of acrylamide, nitrosobenzene does not remain as such in the product, and therefore when the product acrylamide is polymerized to be used for various purposes the deterioration in polymerizability of the product acrylamide can be advantageously avoided. Ordinarily, nitrosobenzene added during the production steps of acrylamide is left in the product acrylamide crystals in an amount ranging from 0.001 to 0.005% (by weight) based on acrylamide though the amount left varies depending on the production condition. A major portion of the remaining nitrosobenzene is distilled together with the vapor of solvent particularly at the concentration step. Distilled nitrosobenzene can be recondensed and recyclically utilized without being wasted.

In the concentration step nitrosbenzene is preferably used in combination with other difficultly escaping polymerization inhibitor such as sodium-1-naphthylamine-4-sulfonate or nitrosometacresol. In this case each addition amount of 0.005 to 0.1% by weight based on acrylamide are preferred. In this case, nitrosobenzene and difficultly escaping polymerization inhibitor effectively display polymerization inhibiting ability in the concentration step, and further difficultly escaping polymerization inhibitor remains in the product and inhibit the polymerization in storing of acrylamide. Thus, the combination use of the polymerization inhibitor of the present invention gives many advantages.

Further, a known polymerization inhibitor such as ferrous salt may also be used in combination with the polymerization inhibitor of the present invention.

The acrylamide is polymerized or copolymerized and is used as paper strength-reinforcing agent, soil stablizer, adhesive, disperser, soil improver, fiber treating agent or precipitation accelerator.

The present invention is further illustrated with reference to the following examples, but it should be construed that the invention is not limited only to the modes of these examples. All percent and p.p.m. are by weight.

EXAMPLE 1

20 g. of acrylamide was dissolved in 30 g. of water containing 6% of ammonium sulfate. To the solution, 100 p.p.m. based on the acrylamide of nitrosobenzene was added. After nitrogen substitution of the vessel, the liquid was allowed to stand at 50° C. under 200 mm. Hg for 8 hours, and was then subjected to measurement of polymerizate.

After 8 hours no polymerizate was present and the liquid was transparent and almost colorless. Whereas in the case no nitrosobenzene had been added, 10% of the acrylamide was polymerized and the liquid became white and turbid.

EXAMPLE 2

20 g. of acrylamide was dissolved in 30 g. of methanol containing 0.1% of ammonium sulfate. To the solution, nitrosobenzene was added, and the liquid, after nitrogen substitution of the vessel, was maintained at 50° C. under 500 mm. Hg and was subjected to measurement of period of time before polymerization initiation. The results are as shown in the following Table 2:

TABLE 2

| Amount of added inhibitor (p.p.m.) | Period of time before polymerization initiation (hr.) |
|---|---|
| 0 | 0.5 |
| 10 | 5 |
| 100 | >8 |
| 1000 | >8 |

As is clear from the above table, a sufficient effect was displayed with the addition amount of 10–100 p.p.m.

EXAMPLE 3

Nitrosobenzene was added to 5 g. of acrylamide, and the mixture was heated to 100° C. in the presence of air to melt the acrylamide and was then subjected to measurement of period of time before polymerization initiation. The results are as shown in the following Table 3:

TABLE 3

| Amount of added inhibitor (p.p.m.) | Period of time before polymerization initiation (hr.) |
|---|---|
| 0 | 0.2 |
| 10 | 4 |
| 100 | >8 |
| 1000 | >8 |

EXAMPLE 4

To a 40% aqueous acrylamide solution was added 0.05% based on acrylamide of nitrosometacresol. The solution was concentrated under reduced pressure until the acrylamide concentration had become 65%, and was then cooled to 10° C. to deposit acrylamide crystals. After centrifugal separation, the crystals were dried at 55° C. under 30 mm. Hg for 6 hours. The acrylamide crystals were markedly excellent in water solubility and no water-insoluble polymerizate was present therein. The acrylamide crystals were formed into a 10% aqueous solution, and the color degree of the solution was measured by colorimetry method to obtain the value APHA 20. The crystals were dissolved in methanol to measure methanol-insoluble polymerizate, but the amount of such polymerizate was 0.007%. Further, the acrylamide crystals were heated to 70° C. for 8 days, but no formation of water-insoluble polymerizate was observed. Nitrosoorthocresol showed polymerization-inhibiting effects similar to those of the nitrosometacresol.

EXAMPLE 5

To the same acrylamide solution of before concentration as in Example 4 were added 0.05% based on acrylamide of nitrosometacresol and 0.001–0.015% based on acrylamide of ferrous sulfate. During the same treating course as in Example 4, however, no operational drawback due to the presence of said ferrous sulfate was observed at all. Further, there was seen no lowering in effect of the added nitrosometacresol due to the presence of a small amount of the incorporated ferrous sulfate.

EXAMPLE 6

150 g. of acrylonitrile was hydrolyzed with 290 g. of 98% sulfuric acid and 41 g. of water at about 97° C. in the presence of ferrous sulfate as the polymerization inhibitor. The resulting acrylamide sulfuric acid salt was neutralized with ammonia at about 40° C. until the pH of the solution reached to 6.5, in the presence of 100 p.p.m. based on acrylamide of nitrosobenzene, in an aqueous neutralization mother liquor obtained in the previous neutralization step. The resulting neutralized mixture was cooled to 5° C. and mixed crystals of acrylamide and ammonium sulfate were separated from the liquid. Then acrylamide was extracted from the mixed crystals by methanol to obtain an acrylamide solution. The acrylamide solution was concentrated at 30° C. under 50 mm. Hg and was cooled to deposit acrylamide crystals. The resulting slurry was subjected to centrifugal separation to be separated into acrylamide crystals and liquid.

The centrifugal separation was effected after adding to the slurry 0.02% based on the acrylamide of a methanol solution of sodium-1-naphthylamine-4-sulfonate. After the centrifugal separation, the acrylamide crystals were subjected to a vacuum drying at 60° C. under 35 mm. Hg for 8 hours. When formed into a 10% acrylamide solution, said crystals showed a color degree of APHA 15. Further, even when the crystals were heated at 70° C. for one week in the presence of air, no formation of water-insoluble polymerizate was observed and the water solubility thereof was quite excellent. In addition, the acrylamide solution after the centrifugal separation was reused 4 times in the neutralization step, but no operational drawback due to the formation of polymerizate was observed at all.

EXAMPLE 7

150 g. of acrylonitrile was hydrolyzed with 290 g. of 98% sulfuric acid and 41 g. of water at about 100° C. in the presence of ferrous sulfate, and the resulting acrylamide sulfuric acid salt was neutralized with ammonia at about 40° C. at a pH of 6.5–7.0, in the aqueous neutralization mother liquor obtained in the previous neutralization step. The acrylamide solution was cooled to 5° C. to deposit mixed crystals of acrylamide and ammonium sulfate, and the mixed crystals were separated from the liquid. The acrylamide in said mixed crystals was extracted with methanol and the extraction liquid containing 42.5% of acrylamide and 0.32% of acrylic acid was separated from the ammonium sulfate. To the extraction liquid, 300 p.p.m. based on the acrylamide of sodium-1-naphthylamine-4-sulfonate was added, and the liquid was concentrated at 45° C. under reduced pressure of 80 mm. Hg until the concentration of acrylamide became 65%. During and after the concentration step, no formation of polymerizate was observed, and no increase in color degree due to the addition of sodium-1-naphthylamine-4-sulfonate was recognized. The liquid after the concentration was cooled to 5° C. to deposit acrylamide crystals, which were then separated and subjected to vacuum drying at 45° C. under 50 mm. Hg. The color degree of the resulting acrylamide crystals in a 10% aqueous solution was less than APHA 10 and no coloration was observed by the naked eye. Further, no water-insoluble substance was seen therein.

EXAMPLE 8

To the same extraction liquid of acrylamide as used in Example 7, 100 p.p.m. based on the acrylamide of nitrosobenzene and 100 p.p.m. based on the acrylamide of nitrosometacresol were added, and the liquid was concentrated at 40° C. under reduced pressure of 50 mm. Hg until the concentration of acrylamide became 65%. The concentrated liquid was cooled to 10° C., and the crystallized acrylamide was separated and then subjected to vacuum drying at 50° C. under 80 mm. Hg. In any of said concentration, crystallization, separation and drying steps, no formation of polymerizate was observed and there were not observed at all such injuries as adhesion or clogging due to the formation of polymerizate. The resulting acrylamide crystals had a purity of 99.4% and contained 0.052% of acrylic acid and 0.16% of ammonium sulfate. The crystals in the form of a 10% aqueous solution showed APHA of 15. The acrylamide crystals contained no water-insoluble substance, and a methanol-insoluble substance contained therein was in a trace amount. Even when heated at 70° C. for 5 days, the acrylamide maintained a purity of more than 98%, formed no water-insoluble polymerizate and was markedly excellent in water solubility.

EXAMPLE 9

To the same extraction liquid of acrylamide as used in Example 7 were added 100 p.p.m. based on the acrylamide of nitrosobenzene and 100 p.p.m. based on the acrylamide of sodium-1-naphthylamine-4-sulfonate. The resulting liquid was treated in the same manners as in Example 7 to obtain acrylamide crystals. The acrylamide crystals were entirely free from coloration, showed APHA of less than 10 in a 10% aqueous solution and were markedly excellent in water solubility. The crystals were allowed to stand af 40° C. for 2 months, but showed no lowering in purity, no increase in color degree and no formation of water-insoluble polymerizate at all.

Acrylamide sulfuric acid salt obtained by the same manner as in Example 7 was continuously added to an

EXAMPLE 10 aqueous recycled neutralization mother liquid maintained at a pH of 6.5–7.0. In neutralizing the liquid by continuously introducing ammonia gas therein at 40° C. 150 p.p.m. based on the acrylamide of nitrosobenzene was added to the neutralization mother liquid. Owing to the addition of nitrosobenzene, the neutralization mother liquid and the acrylamide obtained by the neutralization were greatly improved in stability. When the neutralization mother liquid was recycled at 40° C., no formation of polymerizate was observed at all even after 3 weeks had elapsed, whereas in case said compound had not been added a small amount of a polymerizate adhered after 8 days to interior of the pipings.

What is claimed is:

1. A method of inhibiting the polymerization of acrylamide, which comprises adding to acrylamide a stabilizing amount of at least one polymerization inhibitor selected from the group consisting of nitrosobenzene, nitrosometacresol, and sodium-1-naphthylamine-4-sulfonate.

2. A method according to claim 1, wherein said polymerization inhibitor is employed in an amount ranging from 0.0005 to 1.0 weight percent based on acrylamide.

3. A method of inhibiting the polymerization of acrylamide, which comprises, in the neutralization of acrylamide sulfuric acid salt, adding nitrosobenzene in an amount ranging from 0.005 to 0.1 weight percent based on acrylamide.

4. A method of inhibiting the polymerization of acrylamide, which comprises, in the concentration of the solution containing acrylamide, adding to the solution nitrosobenzene in an amount ranging from 0.005 to 0.1 weight percent based on acrylamide and nitrosometacresol in an amount ranging from 0.005 to 0.1 weight percent based on acrylamide.

5. A method of inhibiting the polymerization of acrylamide, which comprises, in the concentration of the solution containing acrylamide, adding to the solution nitrosobenzene in an amount ranging from 0.005 to 0.1 weight percent based on acrylamide and sodium-1-naphthylamine-4-sulfonate in an amount ranging from 0.005 to 0.1 weight percent based on acrylamide.

6. A method of inhibiting polymerization of acrylamide during concentration of acrylamide solution, drying up of the resulting acrylamide crystals, and storage of the acrylamide crystals, which comprises adding to the acrylamide solution a stabilizing amount of nitrosobenzene, nitrosometacresol or sodium-1-naphthylamine-4 sulfonate or mixture thereof before concentrating step, and then concentrating, drying and storing the acrylamide.

7. A composition comprising acrylamide and a stabilizing amount of at least one polymerization inhibitor selected from the group consisting of nitrosobenzene, nitrosometacresol, and sodium-1-naphthylamine-4-sulfonate.

8. A composition according to claim 7, wherein said polymerization inhibitor is nitrosobenzene.

9. A composition according to claim 7, wherein said polymerization inhibitor is nitrosometacresol.

10. A composition according to claim 7, wherein said polymerization inhibitor is sodium-1-naphthylamine-4-sulfonate.

References Cited

UNITED STATES PATENTS

| | | | |
|---|---|---|---|
| 2,026,894 | 1/1936 | Hill | 260—112 |
| 2,587,210 | 2/1952 | Phillips et al. | 260—561 |
| 2,918,493 | 12/1959 | Panzer et al. | 260—485 |
| 3,028,426 | 4/1962 | Porret et al. | 260—561 |

FOREIGN PATENTS

| | | |
|---|---|---|
| 618,478 | 2/1949 | Great Britain. |
| 846,239 | 8/1960 | Great Britain. |
| 926,223 | 5/1963 | Great Britain. |

OTHER REFERENCES

Schulz, Chem. Abs., 42:4960f, Abs. of Chem. Ber. 80:232–42 (1947).

NICHOLAS S. RIZZO, *Primary Examiner.*

J. A. NARCAVAGE, *Assistant Examiner.*